April 24, 1928.
J. D. LANGDON
TRUSS ROD
Filed Aug. 17, 1925
1,667,209
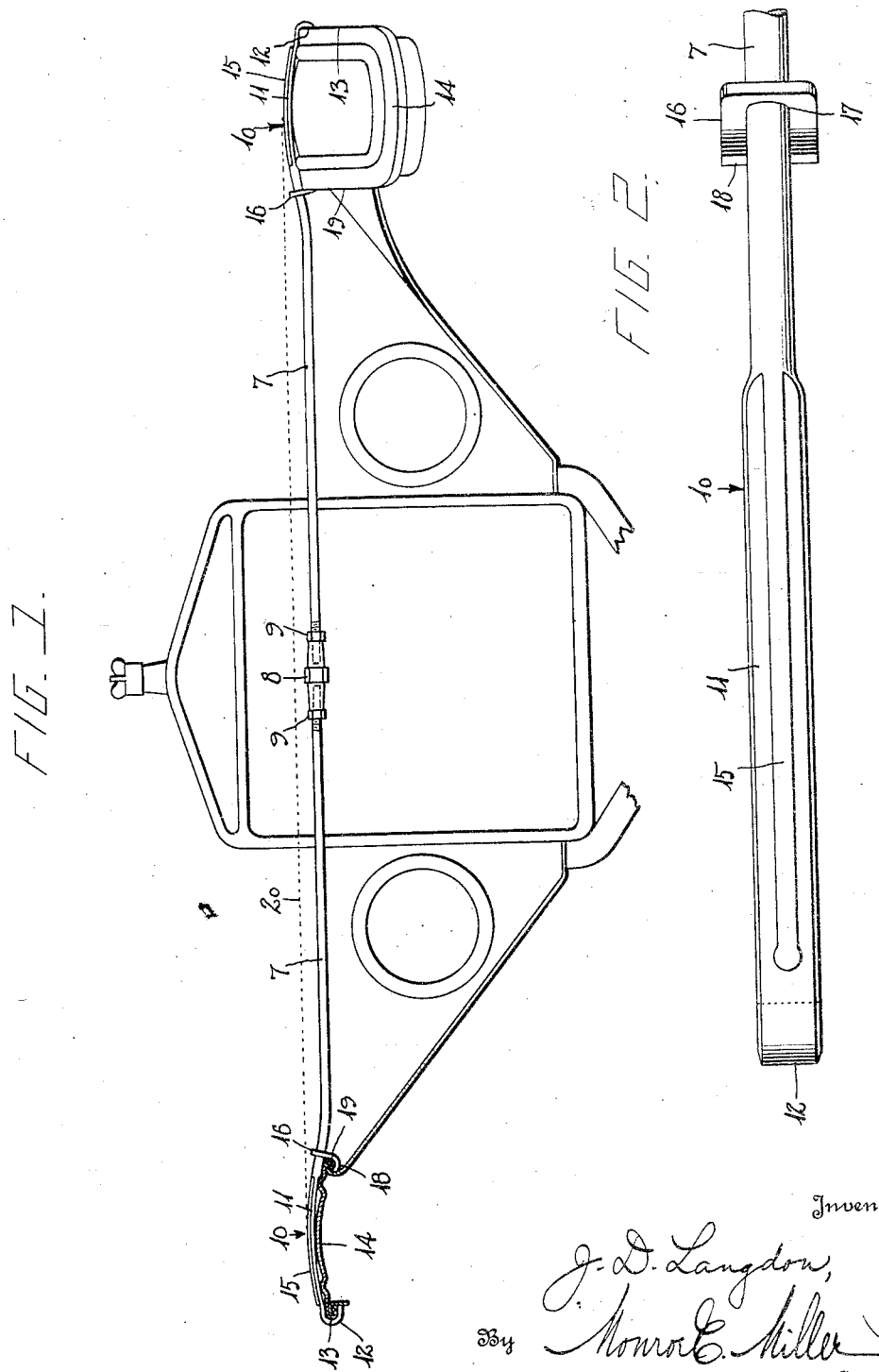
Inventor:
J. D. Langdon,
By 
Attorney.

Patented Apr. 24, 1928.

1,667,209

UNITED STATES PATENT OFFICE.

JESSE D. LANGDON, OF LOS ANGELES, CALIFORNIA, ASSIGNOR TO PETROLEUM MACHINERY DEVELOPMENT CORPORATION, OF RENO, NEVADA.

TRUSS ROD.

Continuation of application Serial No. 672,619, filed November 3, 1923. This application filed August 17, 1925. Serial No. 50,691.

The present invention relates to truss rods, and aims to provide a novel and improved truss rod adapted especially for connecting and bracing wheel fenders of automobiles, but capable of use for other purposes also, this application being based on application Serial No. 672,619, filed November 3, 1923.

Another object of the invention is the provision of a truss rod of novel construction and having novel means for engaging the fenders or objects, in order that the rod will be effectively secured in engagement with the fenders or objects, with a simple and inexpensive construction and a minimum number of parts.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a fragmentary front view of an automobile showing the truss rod applied to the front wheel fenders, portions being shown in section.

Fig. 2 is an enlarged plan view of one terminal portion of the truss rod.

The rod may be of any suitable length, according to the use to which it is put, and is composed of iron, steel, or other suitable resilient metal. The rod comprises the two duplicate sections 7, and a turnbuckle 8 screw-threaded on the adjacent terminals of the sections 7 for drawing said sections toward one another. Lock nuts 9 are also screw-threaded on said sections to abut the ends of the turnbuckle 8 and maintain the adjustment.

The sections 7 are provided at their opposite terminals with curved portions 10, which are convexed longitudinally of the rod so as to be raised or offset upwardly above the horizontal axis of the rod. The portions 10 are flattened transversely, as at 11, and the outer extremities of the sections 7 are bent downwardly and backwardly to form the hooks 12 to engage across and under the outer beads 13 of the front wheel fenders 14 of the automobile. The transversely flattened portions 11 extend from the hooks 12 to points short of but close to the inner edges of the fenders 14, and said portions may bear flatly (that is transversely of the portions 11) on the fenders. The portions 11 are formed with raised longitudinal ribs 15 extending from the inner ends of the portions 11 to points short of the hooks 12. The ribs 15 have an ornamental effect and also prevent the too free bending or springing of the transversely flattened portions 11.

Small plates or pieces 16 are slidable on the sections 7 of the rod and have apertures 17 loosely receiving the rod. Said plates or pieces have their lower ends bent to form hooks 18 for engaging under the beads 19 extending along the inner edges of the fenders 14.

In applying the device to the fenders 14, the hook members or plates 16 are first slid onto the sections 7, and the nuts 19 are then screw-threaded on the inner terminals of said sections. The inner ends of the sections 7 are then screwed slightly (about one turn) in the ends of the turnbuckle 8. One hook 12 is then engaged across and under the corresponding bead 13, and the rod is positioned slightly in front of the radiator. The opposite terminal of the rod is then placed on the corresponding fender and the other hook is then snapped under the bead 13 of the last named fender, the fender being sprung inwardly if necessary to engage the last hook 12 under the bead. Each section 7 is then sprung downwardly at the inner side of the corresponding fender, and the hook member or plate 16 slid outwardly so that the hook 18 can engage under the corresponding bead 19. Thus, by springing the sections 7 downwardly the hooks can be engaged under the beads 19, and when the sections 7 are released they spring upwardly thereby drawing the members 16 upwardly into tight engagement with the beads 19. The turnbuckle 8 is then turned for drawing the sections 7 toward one another, thereby trussing and bracing the fenders 14, and the rod will also serve as a tie rod between the fenders. In contracting the rod lengthwise, the intermediate portion of the rod, which is below the horizontal line 20 connecting the crowns of the portions 10, has a tendency to be raised upwardly toward the line 20, due to a tendency for the rod to straighten out under tension between the crowns of the portions 10. As a result, the hook members 16 are drawn upwardly and held tightly in engagement with the beads 19. Consequently, the members 16, which are of extremely simple construction, are held in effective engagement with the fenders, although the members or plates 16 are loose on the rod and do not have any securing elements for holding them in place on the rod.

The construction is extremely simple, being economical to manufacture, and the device being also readily installed.

The device may be used for other purposes also for which it is suitable, so that the fenders 14 may be taken to represent other objects to which the hooks 12 and 18 may be applied.

The present application is a continuation of my application for patent filed Nov. 3, 1923, Serial No. 672,619.

Having thus described the invention, what is claimed as new is:—

1. A truss rod having curved portions to extend across objects and terminal hooks to engage the outer edges of said objects, said rod having means between said portions for contracting the rod lengthwise so as to tension the rod, and hook members slidable on the rod to engage the inner edges of said objects and so arranged that the straightening out effect of the rod, when tensioned, between said curved portions will draw said members tightly into engagement with said inner edges of the objects.

2. A truss rod having at its opposite terminals curved portions offset above the longitudinal axis of the rod so as to extend across wheel fenders of an automobile, said rod having hooks at its opposite terminals to engage under the beads at the outer edges of said fenders, the intermediate portion of the rod being disposed below a line connecting the crowns of said curved portions and having means for contracting the rod lengthwise to apply tension to the rod to obtain a straightening out effect of the rod toward said line, and hook members slidable on the rod at said curved portions to engage under the beads at the inner edges of the fenders and drawn upwardly tightly into engagement with the lastnamed bead by said straightening out effect when the rod is tensioned.

In testimony whereof I hereunto affix my signature.

JESSE D. LANGDON.